(12) United States Patent
Xie et al.

(10) Patent No.: US 9,224,383 B2
(45) Date of Patent: Dec. 29, 2015

(54) UNSUPERVISED LANGUAGE MODEL ADAPTATION FOR AUTOMATED SPEECH SCORING

(71) Applicant: Educational Testing Service, Princeton, NJ (US)

(72) Inventors: Shasha Xie, Sunnyvale, CA (US); Lei Chen, Pennington, NJ (US)

(73) Assignee: Educational Testing Service, Princeton, NJ (US)

( * ) Notice: Subject to any disclaimer, the term of this patent is extended or adjusted under 35 U.S.C. 154(b) by 289 days.

(21) Appl. No.: 13/803,900

(22) Filed: Mar. 14, 2013

(65) Prior Publication Data

US 2013/0262110 A1 Oct. 3, 2013

Related U.S. Application Data

(60) Provisional application No. 61/617,218, filed on Mar. 29, 2012.

(51) Int. Cl.
*G10L 15/00* (2013.01)
*G10L 15/183* (2013.01)

(52) U.S. Cl.
CPC ............. *G10L 15/005* (2013.01); *G10L 15/183* (2013.01)

(58) Field of Classification Search
CPC ... G10L 15/063; G10L 15/183; G10L 15/065; G10L 15/22; G10L 15/005; G10L 15/08; G10L 15/18; G10L 15/193; G10L 15/19; G10L 15/06; G10L 15/144; G10L 15/265; G10L 2015/221; G06F 17/2818
See application file for complete search history.

(56) References Cited

U.S. PATENT DOCUMENTS

| | | | |
|---|---|---|---|
| 6,418,431 B1* | 7/2002 | Mahajan et al. | 1/1 |
| 7,533,019 B1* | 5/2009 | Hakkani-Tur et al. | 704/252 |
| 7,835,910 B1* | 11/2010 | Hakkani-Tur et al. | 704/243 |
| 8,346,555 B2* | 1/2013 | Metz | 704/257 |
| 8,352,246 B1* | 1/2013 | Lloyd | 704/9 |
| 8,583,416 B2* | 11/2013 | Huang et al. | 704/3 |
| 2003/0200094 A1* | 10/2003 | Gupta et al. | 704/270.1 |
| 2005/0171761 A1* | 8/2005 | Ju et al. | 704/10 |
| 2007/0219798 A1* | 9/2007 | Wang et al. | 704/257 |
| 2009/0055184 A1* | 2/2009 | Hebert | 704/257 |
| 2010/0023331 A1* | 1/2010 | Duta et al. | 704/257 |
| 2010/0098224 A1* | 4/2010 | Bangalore et al. | 379/88.17 |

(Continued)

OTHER PUBLICATIONS

Bacchiani, Michiel, Roark, Brian; Unsupervised Language Model Adaptation; IEEE International Conference on Acoustics, Speech and Signal Processing; 2003.

(Continued)

*Primary Examiner* — Douglas Godbold
*Assistant Examiner* — Michael Ortiz Sanchez
(74) *Attorney, Agent, or Firm* — Jones Day

(57) ABSTRACT

Systems and methods are provided for generating a transcript of a speech sample response to a test question. The speech sample response to the test question is provided to a language model, where the language model is configured to perform an automated speech recognition function. The language model is adapted to the test question to improve the automated speech recognition function by providing to the language model automated speech recognition data related to the test question, Internet data related to the test question, or human-generated transcript data related to the test question. The transcript of the speech sample is generated using the adapted language model.

18 Claims, 10 Drawing Sheets

(56) References Cited

U.S. PATENT DOCUMENTS

| | | | |
|---|---|---|---|
| 2011/0295590 A1* | 12/2011 | Lloyd et al. | 704/8 |
| 2012/0101817 A1* | 4/2012 | Mocenigo et al. | 704/231 |
| 2013/0035932 A1* | 2/2013 | Bangalore et al. | 704/9 |
| 2014/0236575 A1* | 8/2014 | Tur et al. | 704/9 |

OTHER PUBLICATIONS

Baroni, Marco, Bernardini, Silvia; BootCaT: Bootstrapping Corpora and Terms From the Web; Proceedings of LREC, 2004; pp. 1313-1316; 2004.

Chen, Langzhou, Gauvain, Jean-Luc, Lamel, Lori, Adda, Gilles; Unsupervised Language Model Adaptation for Broadcast News; 2003 IEEE International Conference on Acoustics, Speech and Signal Processing; pp. 220-223; 2003.

Eskenazi, Maxine; An Overview of Spoken Language Technology for Education; Speech Communication, 51(10); pp. 832-844; 2009.

Lamel, Lori, Gauvain, Jean-Luc, Adda, Gilles; Lightly Supervised and Unsupervised Acoustic Model Training; Computer Speech & Training, 16(1); pp. 115-129; 2002.

Munteanu, Cosmin, Penn, Gerald, Baecker, Ron; Web-Based Language Modelling for Automatic Lecture Transription; Proceedings of 8th Annual Conference of the International Speech Communication Association; pp. 2353-2356; 2007.

Ng, Tim, Ostendorf, Maria, Hwang, Mei-Yuh, Siu, Manhung, Bulyko, Ivan, Lei, Xin; Web-Data Augmented Language Models for Mandarin Conversational Speech Recognition; Proceedings of ICASSP, 1; 2005.

Riccardi, Giuseppe, Hakkani-Tur, Dilek; Active and Unsupervised Learning for Automatic Speech Recognition; Eighth European Conference on Speech Communication and Technology; 2003.

Sarikaya, Ruhi, Gravano, Agustin, Gao, Yuqing; Rapid Language Model Development Using External Resources for New Spoken Dialog Domains; Proceedings of ICASSP, 1; pp. 573-576; 2005.

Tur, Gokhan, Haddani-Tur, Dilek, Schapire, Robert; Combining Active and Semi-Supervised Learning for Spoken Language Understanding; Speech Communication, 45(2); pp. 171-186; 2005.

Yu, Kai, Gales, Mark, Wang, Lan, Woodland, Philip; Unsupervised Training and Directed Manual Transcription for LVCSR; Speech Communication, 52(7-8); pp. 652-663; 2010.

* cited by examiner

| BASELINE | UNSUPERVISED | | | SEMI | SUPERVISED |
|---|---|---|---|---|---|
| | ASR | WEB | ASR & WEB | | |
| 42.8 | 38.1 | 38.5 | 37.6 | 37.8 | 34.7 |

Fig. 7

UNSUPERVISED LANGUAGE MODEL ADAPTATION FOR AUTOMATED SPEECH SCORING

CROSS REFERENCE TO RELATED APPLICATIONS

This application claims priority to U.S. Provisional Patent Application No. 61/617,218, filed Mar. 29, 2012, entitled "Unsupervised Language Model Adaptation for Automated Speech Scoring," the entirety of which is herein incorporated by reference.

TECHNICAL FIELD

The technology described herein relates generally to automated speech assessment and more particularly to systems and methods for adapting language models to test questions to achieve higher recognition accuracy of spoken responses to the test questions.

BACKGROUND

Word-level transcriptions may be needed to train or adapt large vocabulary continuous speech recognition (LVCSR) systems. However, it can be time-consuming and costly to obtain human transcriptions, especially when facing large-sized training data sets. Automated speech assessment, a fast-growing area in the speech research field, may use an automated speech recognition (ASR) system to recognize input speech responses, and the ASR outputs may be used to generate features for a scoring model. Since the recognition accuracy of the ASR system directly influences the quality of the speech features, especially features related to word entities (e.g., those measuring grammar accuracy and vocabulary richness), it may be important to use ASR systems with a high recognition accuracy.

SUMMARY

The present disclosure is directed to systems and methods for generating a transcript of a speech sample response to a test question. The speech sample response to the test question is provided to a language model, where the language model is configured to perform an automated speech recognition function. The language model is adapted to the test question to improve the automated speech recognition function by providing to the language model automated speech recognition data related to the test question. Internet data related to the test question, or human-generated transcript data related to the test question. The transcript of the speech sample is generated using the adapted language model.

BRIEF DESCRIPTION OF THE FIGURES

FIG. 7 is a table comparing performance results of different language model adaptation methods.

DETAILED DESCRIPTION

Figure 1:
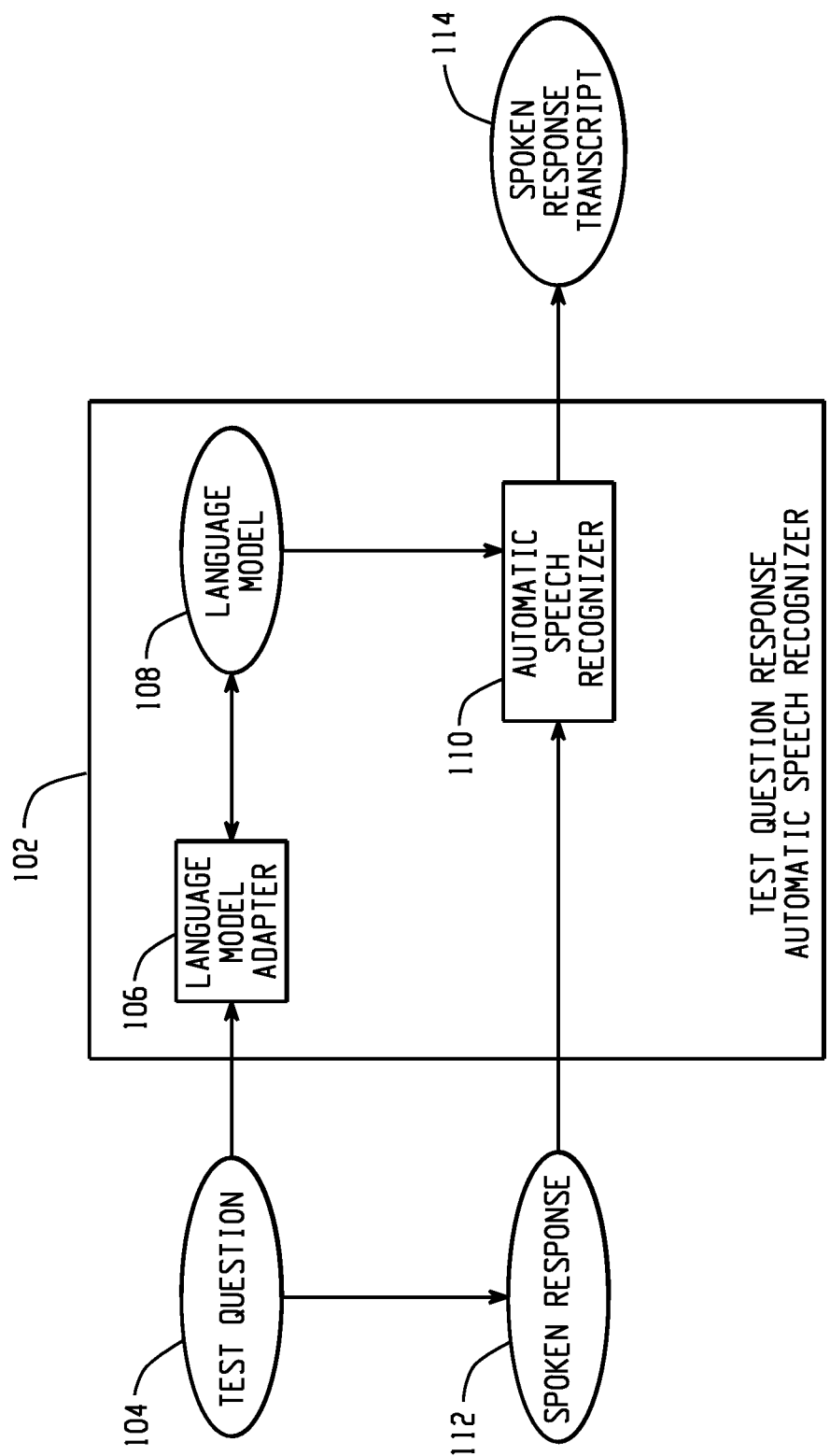
FIG. 1 is a block diagram depicting a test question response automatic speech recognizer.

Automated speech assessment systems may require use of ASR systems with high recognition accuracy. When using an automated speech assessment system to evaluate responses to a test, adaptation of language models (LMs) to the test questions may be an effective method of improving recognition accuracy. However, for large-scale language tests, ordinary supervised training of language models, which may require use of an expensive and time-consuming manual transcription process performed by humans, may be difficult to utilize for LM adaptation. First, for high-stakes tests administered globally, a very large pool of test questions may be required to strengthen the tests' security and validity. Consequently, use of ordinary supervised training to adapt LM models to test responses may require transcription of a large set of audio files to cover all of these questions. Second, it may not be practical to have a pre-test to collect enough speech responses for adaptation purposes. Thus, LM adaptation methods that allow for recognition accuracy gain with no or low human transcription involvement may be desirable. Such adaptation methods may be used to obtain LM adaptation data in a lower-cost and faster way than the ordinary supervised training method.

LM adaptation may be performed using an unsupervised training method. Unsupervised training may involve use of speech samples that have not been transcribed for training or adapting ASR systems. In unsupervised training, an initial ASR model (i.e., seed model) may be used to recognize the untranscribed audio, and the ASR model's outputs may be used in the subsequent training of the LM. Unsupervised LM adaptation may be used to reduce perplexity and word error rate (WER) metrics relative to those of a baseline LM and may be performed without human involvement.

LM adaptation may also be performed using an active learning method. Active learning may be used to reduce a number of manually-transcribed training examples by automatically processing examples that have not been transcribed and then selecting the most informative ones with respect to a given cost function. Unsupervised training and active learning may be combined for ASR training to minimize a human transcription workload. One method of combining active learning and unsupervised training methods may involve using directed manual transcriptions, where a relatively small amount of poorly recognized utterances may be replaced with human transcriptions. This technique may be referred to as a semi-supervised LM adaptation method.

Data from the Internet may also be used in LM adaptation, especially when in-domain training material is limited. Internet data may be used for LM adaptation to reduce perplexity, character recognition error rate, and WER by enabling a collection of an Internet corpus appropriate for modeling particular responses. Internet data for this purpose may be gathered by generating a series of search queries and retrieving web pages from a search engine using these queries.

FIG. 1 is a block diagram depicting a test question response automatic speech recognizer. A test question response automatic speech recognizer 102 receives content of a test question 104. The content of the test question is provided to a language model adapter 106. The language model adapter is configured to acquire supplemental data content based on the content of the test question 104. The language model adapter 106 is further configured to adapt the language model 108 of the automatic speech recognizer 102 based on the acquired supplemental content. Such an adaptation can improve the recognition capabilities of an automatic speech recognizer 110. A speech sample is received at 112. The speech sample 112 is a response to the test question 104. The speech sample 112 is provided to the automatic speech recognizer 110, which generates a transcript 114 of the speech sample 112 using the adapted language model 108

Figure 2:
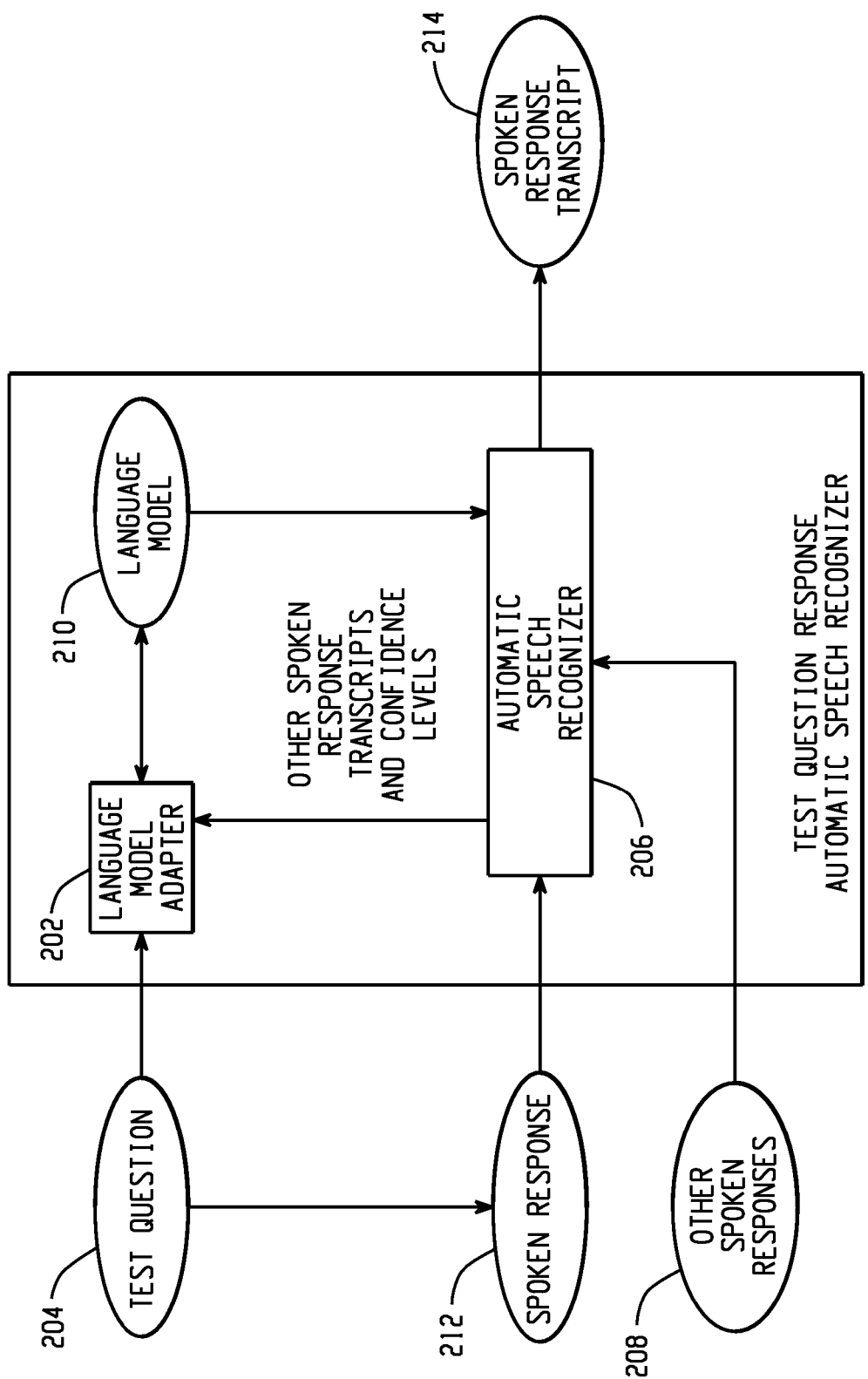
FIG. 2 is a block diagram depicting acquisition of supplemental content based on previously generated transcripts of other responses to the test question.

As noted above, supplemental data content based on the content of the test question can be acquired in a variety of ways. FIG. 2 is a block diagram depicting acquisition of supplemental content based on previously generated transcripts of other responses to the test question. Similar to FIG. 1, a language model adapter 202 receives a test question 204. The language model adapter 202 acquires supplemental data content based on the content of the test question 204 from the automatic speech recognizer 206. Specifically, the automatic speech recognizer 206 is configured to automatically recognize speech in one or more other spoken responses 208 to the test question 204 to generate a training transcript. The recognized words from the other spoken responses 208 are associated with confidence scores, recognizing the degree of confidence that the automatic speech recognizer 206 has that is recognition is accurate. Words that the automatic speech recognizer 206 is confident in (e.g., words of the training transcript having a confidence score above a threshold level) are incorporated into the language model 210 along with a weight, such as a weight corresponding to the automatic speech recognizer 206 confidence level. A spoken response to be scored 212 based on the test question 204 is received, and a transcript 214 of that spoken response 212 is generated by the automatic speech recognizer 206 using the language model 210.

Figure 3:
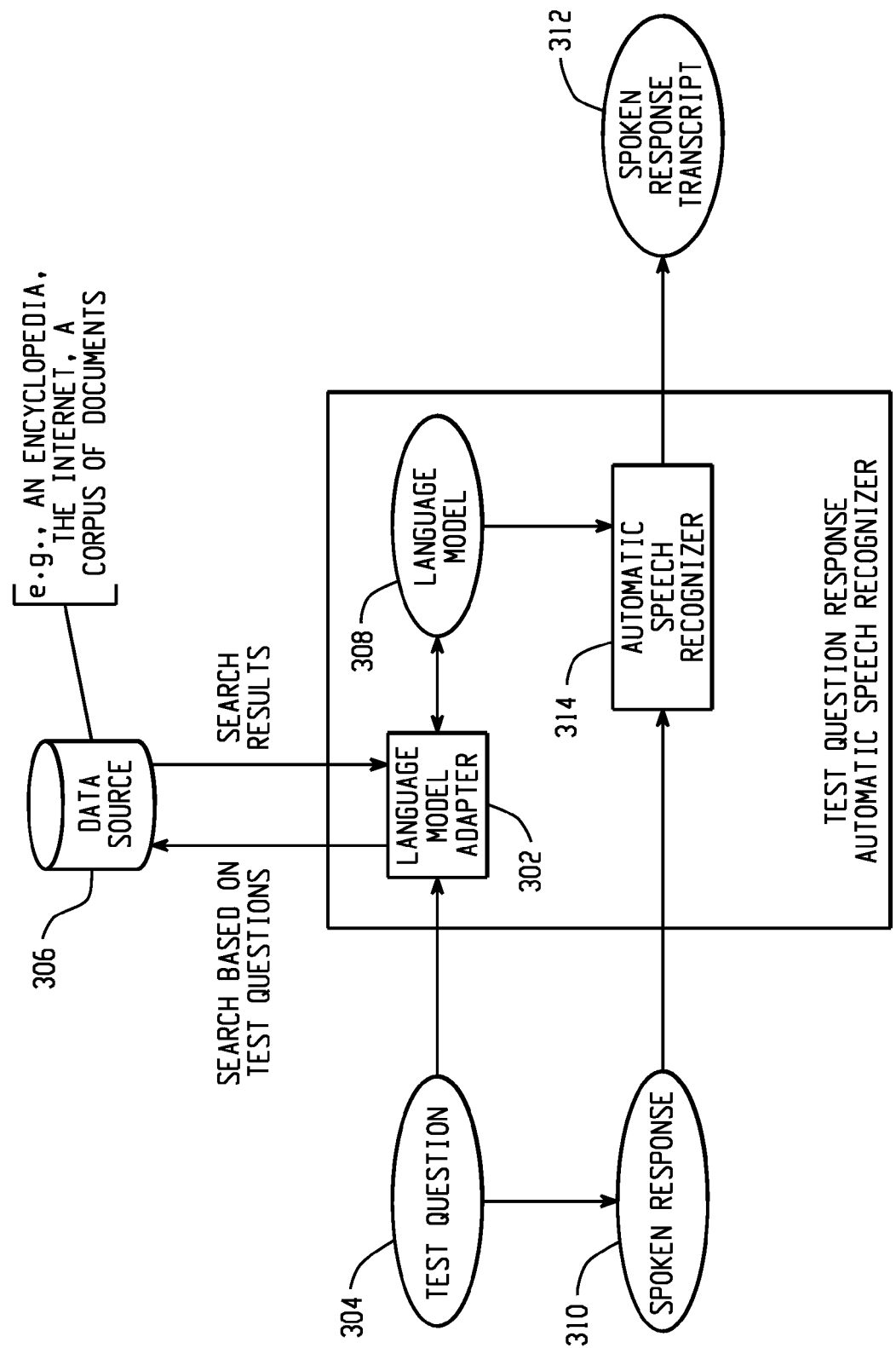
FIG. 3 is a block diagram depicting another example of acquisition of supplemental content based on a search of a data source based on terminology of the test question.

FIG. 3 is a block diagram depicting another example of acquisition of supplemental content based on a search of a data source based on terminology of the test question. A language model adapter 302 receives a test question 304. The language model adapter 302 acquires supplemental data content based on the content of the test question 304 from an external data source 306. Specifically, a search of the data source 306 is performed based on the content of the test question 304. The supplemental content used to adapt the language model 308 is extracted from the search results from the data source 306. For example, words that appear often in the search results may be incorporated into the language model 308 with a higher weighting than words that appear less often. The data source 306 may take a variety of forms such as an encyclopedia, the Internet, or other corpus of documents. The form of the data source 306 may be selected based on the type of test. For example, a test of factual information may utilize a more formal data source, such as an encyclopedia, while a more general test of English speaking ability may use a more general corpus of documents, such as a broad Internet search using an Internet search engine. A spoken response to be scored 310 based on the test question 304 is received, and a transcript 312 of that spoken response 310 is generated by the automatic speech recognizer 314 using the language model 308.

An example experiment was performed to demonstrate LM adaptation methods that may allow for recognition accuracy gain with no or low human transcription involvement. For the example experiment, in-domain data was taken from the Test of English for International Communication (TOEIC), which is a test targeted to the business market, designed to test a basic speaking ability required in international business communications. Several test item types (e.g., reading, answering survey questions, answering voice mails, and expressing opinions) may be included in one TOEIC test session. In the example experiment, opinion items from the TOEIC test were primarily used. An example opinion item test question includes the following: "Do you agree or disagree with the following statement? The most important quality to show in a job interview is confidence. Use specific reasons or examples to support your answer."

The example experiment utilized a state-of-the-art Hidden Markov Model large vocabulary continuous speech recognition (HMM LVCSR) system. The HMM LVCSR system contained a cross-word tri-phone acoustic model (AM) and a combination of bi-gram, tri-gram, and up to four-gram LMs. The AM and LMs were trained using supervised training from approximately 800 hours of audio and manual transcriptions from Test of English as a Foreign Language (TOEFL) data. The TOEFL is a large-scale English test used to assess test-takers' ability to use English to study in colleges using English as the primary teaching language. Compared to TOEIC data, TOEFL questions predominantly focus on prospective students' campus lives, such as discussions about lectures. When testing this recognizer on the TOEFL data, a word error rate (WER) of 33.0% was achieved. This recognizer was used as the seed recognizer in the example experiment.

For the example experiment, audio responses to opinion questions from the TOEIC data were collected. This data set was randomly selected from the TOEIC data, which included responses from test-takers with different first-languages and English-speaking proficiency levels. These audio responses were manually transcribed. For the example experiment, 1,654 responses total were used and transcribed. Of these 1,654 responses, 1,470 were used for LM adaptation, and the remaining 184 responses were used to evaluate speech recognition accuracy. When testing the seed recognizer on the 184 evaluation responses without any LM adaptation, a WER of 42.8% was achieved, which is higher than the seed recognizer achieved on the TOEFL data (33.0%). Using ordinary supervised training and adapting the LMs using the 1,470 responses manually transcribed by a human, a WER of 34.7% was achieved. This WER is close to the seed recognizer's performance on the in-domain TOEFL data.

Unsupervised LM Adaptation

The example experiment was continued using an unsupervised LM adaptation method. Using the seed recognizer trained on the TOEFL data, ASR was performed on the 1,470 adaptation responses. Varying amounts of the ASR output were subsequently selected for LM adaptation. In one instance, responses with high confidence scores, as estimated by the seed recognizer, were selected. These responses were selected so that ASR outputs with higher recognition accuracy could be used on the LM adaptation task. Two methods were used to measure the confidence score for each response using word-level confidence scores. One method involved taking the average of all word confidence scores a response contained, as shown in the following equation:

$$Conf_{perWord} = \frac{1}{N} \sum_{i=1}^{N} conf(w_i)$$

where $conf(w_i)$ is the confidence score of word, $w_i$. The other method involved consideration of each word's duration, as shown in the following equation:

$$Conf_{perSec} = \frac{\sum_{i=1}^{N} d(w_i) * conf(w_i)}{\sum_{i=1}^{N} d(w_i)}$$

where $d(w_i)$ is the duration of $w_i$.

Figure 4:
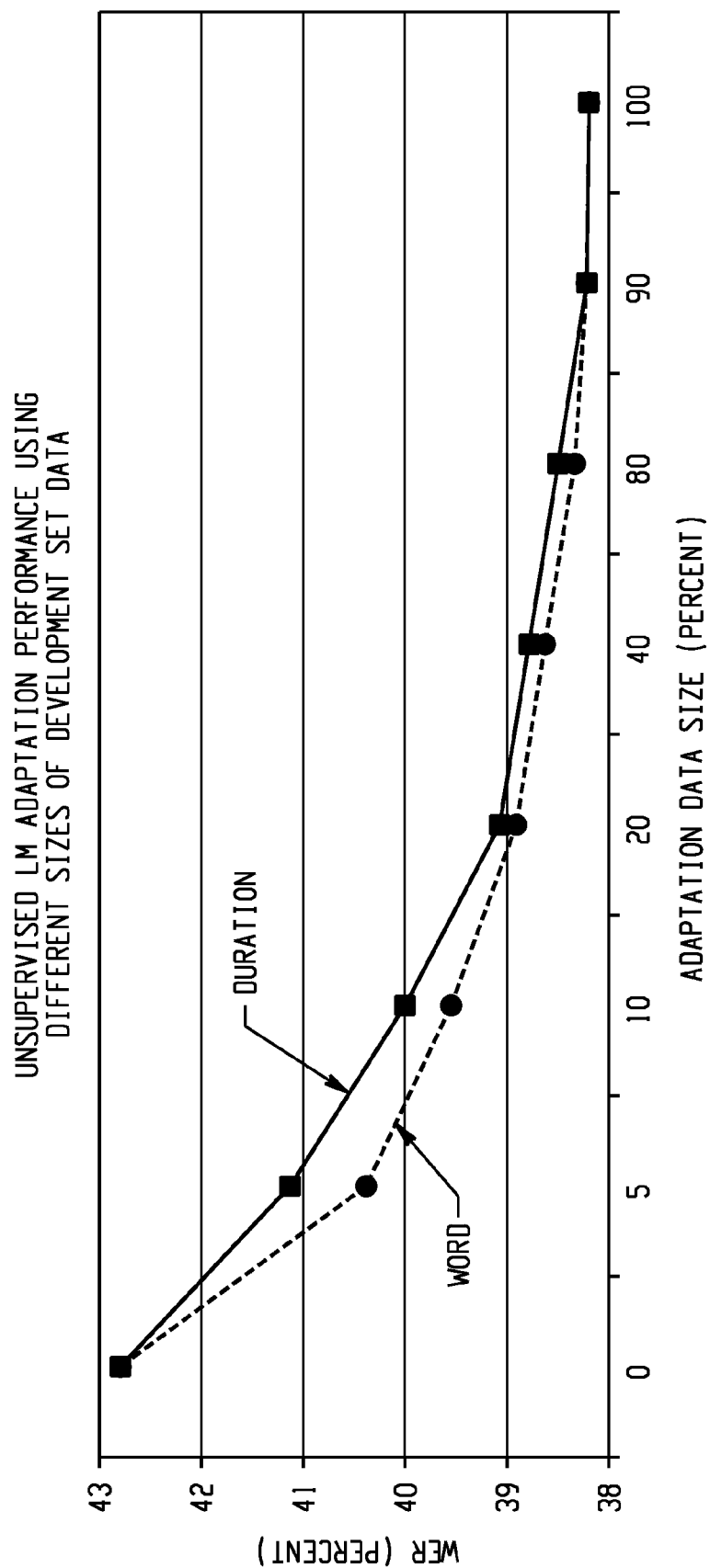
FIG. 4 is a graph depicting results from an example experiment utilizing unsupervised language model adaptation.

FIG. 4 is a graph depicting results from the example experiment utilizing unsupervised LM adaptation. The unsupervised LM adaptation method used to generate the data of FIG. 4 involved selecting adaptation responses that had high word-based ($Conf_{perWord}$) and high duration-based ($Conf_{perSec}$) confidence scores. The data sizes used for adaptation vary from 0% (without any adaptation) to 100% (using all adaptation data). FIG. 4 illustrates continuous reduction of WER with increasing adaptation data size. FIG. 4 also shows that using the word-based confidence scores for data selection performs slightly better than using the duration-based confidence scores, but there is no significant difference between these two selection criteria.

Figure 5:
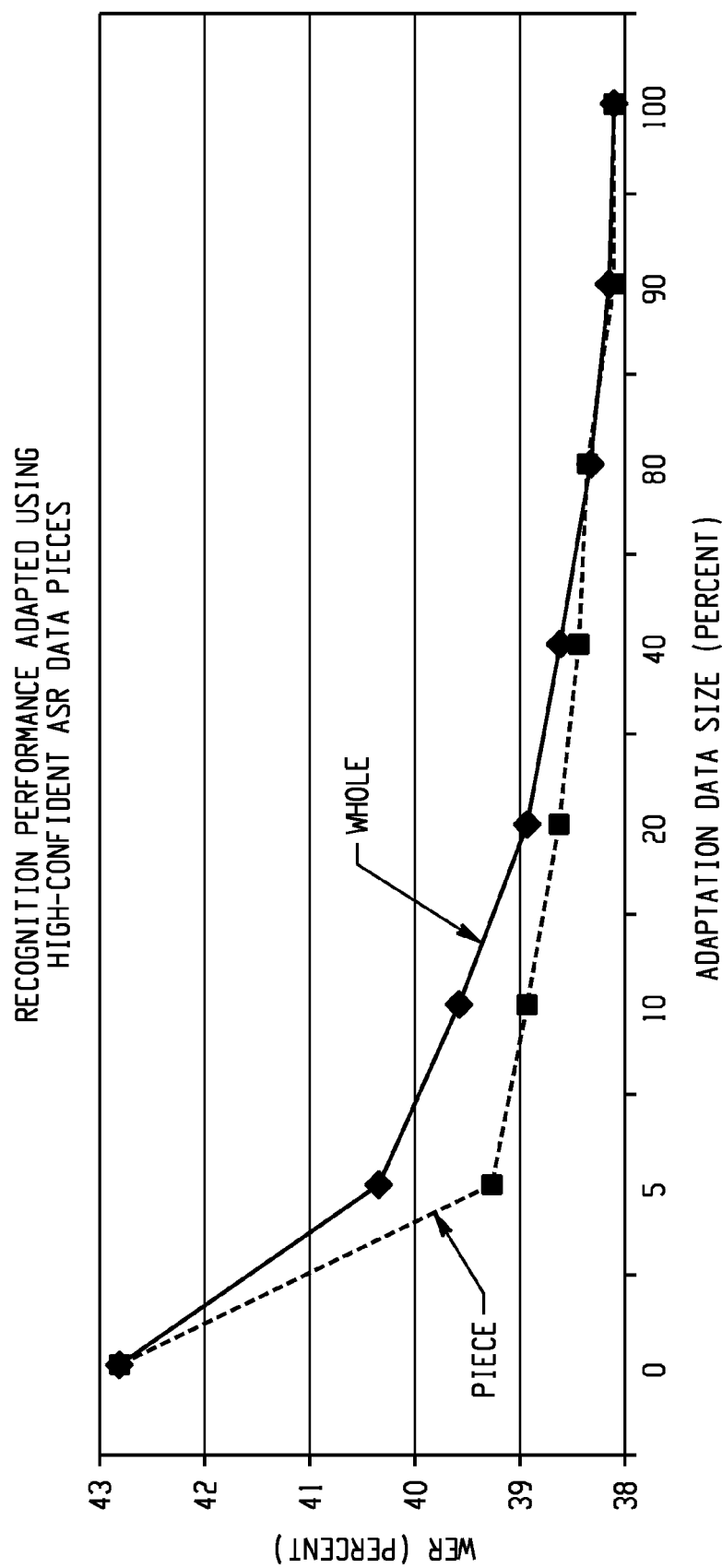
FIG. 5 is a graph depicting results from another example experiment utilizing unsupervised language model adaptation, where high confidence pieces of automatic speech recognition outputs were used for adaptation.

The speech responses used in the example experiment were approximately one minute long in length, and ASR accuracy varied within each response. Therefore, in the example experiment, instead of solely using entire responses, smaller units were also investigated for LM adaptation. Thus, all of the ASR outputs were split into word sequences with fixed lengths (10-15 words), and word sequences with higher per-word confidence scores ($Conf_{perWord}$) were extracted for model adaptation. FIG. 5 is a graph depicting results from another example experiment utilizing unsupervised language model adaptation, where high confidence pieces of automatic speech recognition outputs were used for adaptation. FIG. 5 depicts WER using different sizes of high-confidence pieces for adaptation, measured by percentage of the adaptation set. FIG. 5 contrasts this data with WER results obtained by using response-level ASR outputs for LM adaptation. FIG. 5 illustrates that using word-sequence pieces rather than entire responses leads to a faster WER reduction. When only using 5% of the adaptation data, a 3.5% absolute WER reduction compared to the baseline result without adaptation was achieved. FIGS. 4 and 5 illustrate that unsupervised training using ASR transcriptions from a seed ASR system may be used to achieve higher accuracy than an ASR system without any domain adaptation.

Web-Learning LM Adaptation

The example experiment was continued by using Internet data for LM adaptation. This involved building a training corpus from Internet data based on test questions. In the experiment, BootCat software was used to collect data from the Internet to serve as LM adaptation data. For the example experiment, the same TOEIC test data as used for the unsupervised training method was again used. Based on test prompts in the TOEIC test, web queries were manually generated. After receiving the search queries, the BootCat tool searched the Internet using the Microsoft Bing search engine. Top-ranked web pages were downloaded, and texts from these web pages were extracted. The Internet search results (including URLs and texts) returned by the BootCat tool were examined. In the experiment, the returned web data had varied matching rates among these prompts and was generally noisy.

For the experiment, 5312 utterances in total were collected from the Internet data. After a simple text normalization, these utterances were used for LM adaptation. After performing the LM adaptation using the Internet data, the WER on the TOEIC evaluation data was 38.5%. This WER result is slightly higher than the WER result achieved by unsupervised LM adaptation (38.1%). The Internet-based corpus cannot contain recognition errors (e.g., as found in the unsupervised training method using ASR outputs), so the slight drop in performance may be due to issues in controlling quality and relatedness of the Internet-based corpus. Although web data may be noisy and its relatedness to real test responses may not always be guaranteed, text data collected from the Web may nevertheless be used to adapt LMs to better fit responses to test questions. Automatic generation of web queries based on test questions may also be used to further eliminate a need for human involvement in the web-learning approach to LM adaptation.

The example experiment was also performed using a combination of both an unsupervised training method (using ASR data) and an Internet data method for LM adaptation. For this experiment, a WER of 37.6% was achieved. This WER is lower than that obtained using either of the two LM adaptation methods separately.

Semi-Supervised LM Adaptation

Figure 6:
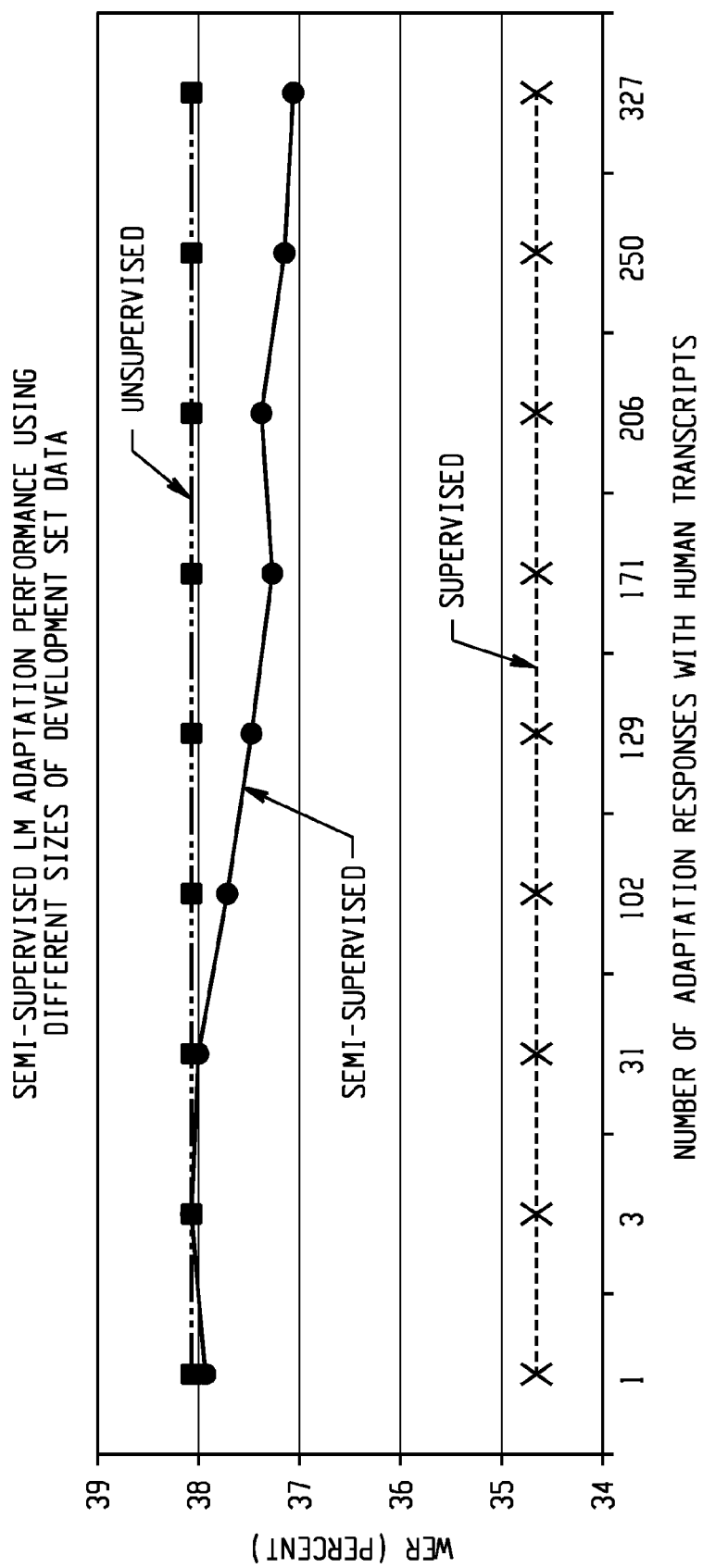
FIG. 6 is a graph comparing results of an unsupervised method, a semi-supervised method, and a supervised method for performing language model adaptation.

To cope with recognition errors brought on by using the unsupervised training methods, the example experiment was performed using a semi-supervised approach for performing LM adaptation. For the semi-supervised LM adaptation approach, ASR data for speech responses with lower confidence scores were replaced with corresponding human-generated transcripts. Thus, LM adaptation was performed using high confidence score ASR data together with a small amount of human transcript data, under the rationale that less noise may be introduced during adaptation. Different confidence thresholds were set for selecting low confidence ASR data to be replaced with human transcript data. FIG. 6 is a graph comparing results of the unsupervised method, the semi-supervised method described here, and the supervised method for performing LM adaptation. FIG. 6 illustrates that WER consistently decreased when an increasing number of human transcripts were introduced.

For the semi-supervised approach, performing LM adaptation in multiple iterations may also be used to further improve ASR performance. For each iteration, a small amount of responses that are poorly recognized by the current ASR system may be manually transcribed by a human. This method may have a full flavor of active learning.

FIG. 7 is a table comparing performance results of different LM adaptation methods for the example experiment described above. The different LM adaptation methods include a baseline method (no adaptation), unsupervised methods (using ASR data, Internet data, and combined ASR data and Internet data), a semi-supervised method (replacing ASR data with lower confidence scores with corresponding human transcript data), and a supervised method. The semi-supervised results of FIG. 7 correspond to the instance where 100 low-confidence ASR responses were replaced with human transcripts. All unsupervised and semi-supervised methods improve ASR performance as compared to the baseline results. For the semi-supervised LM adaptation experiment results, the 100 responses transcribed by humans correspond to only 6.8% of the 1,470 responses in the adaptation data set. Even with this small percentage of responses transcribed, the method still achieved 61.73% of the 8.1% WER reduction achieved when using the ordinary supervised training that requires transcription of all 1,470 responses. Thus, in certain situations (e.g., time sensitive situations), unsupervised and semi-supervised methods may be used to achieve improved ASR outputs and may be used instead of the ordinary supervised training for LM adaptation. Further example experiments may be performed using testing data of a larger size and with more types of questions and spoken tests.

Figure 8:
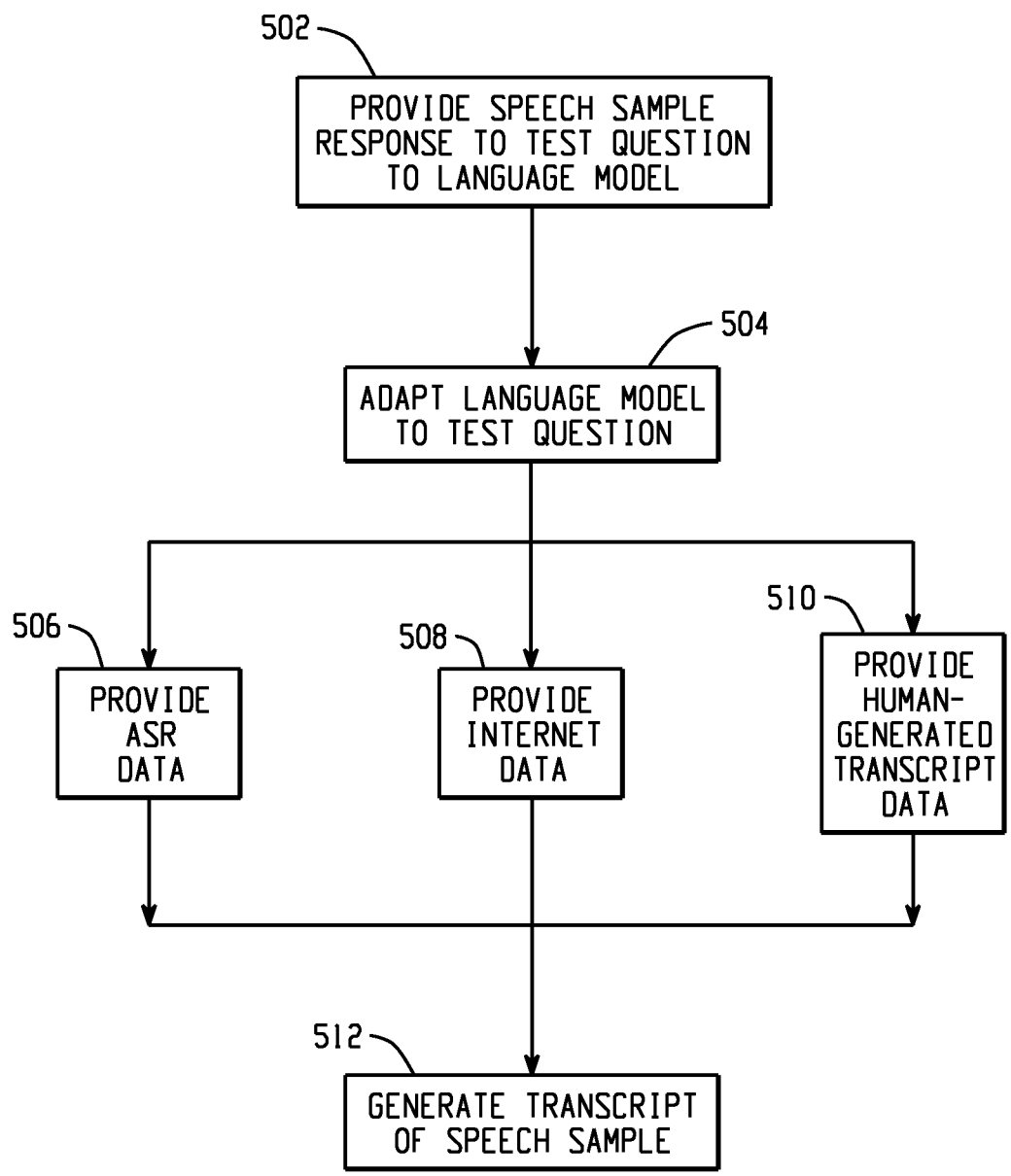
FIG. 8 is a flowchart illustrating a method of generating a transcript of a speech sample response to a test question.

FIG. 8 is a flowchart illustrating a method of generating a transcript of a speech sample response to a test question. At 502, a speech sample is provided to a language model, where the language model is configured to perform an automated speech recognition function. At 504, the language model is adapted to the test question to improve the automated speech recognition function. The adaptation occurs by providing to the language model automated speech recognition data related to the test question 506, Internet data related to the test question 508, or human-generated transcript data related to the test question 510. At 512, the transcript of the speech sample is generated using the adapted language model.

Figure 9A:
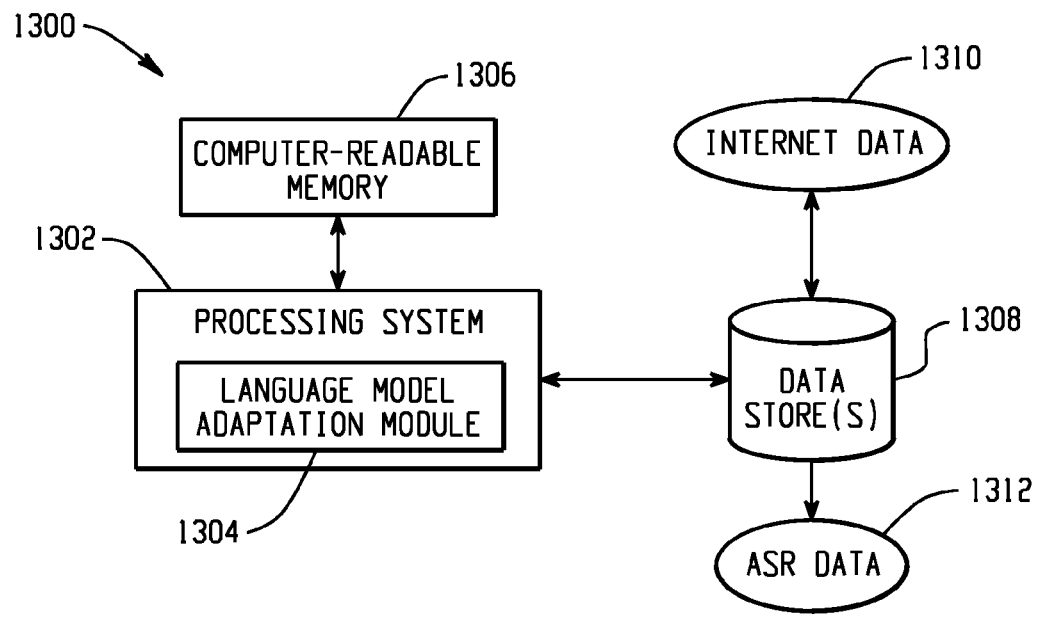
FIGS. 9A, 9B, and 9C depict example systems for use in implementing a method of generating a transcript of a speech sample response to a test question.
Figure 9B:
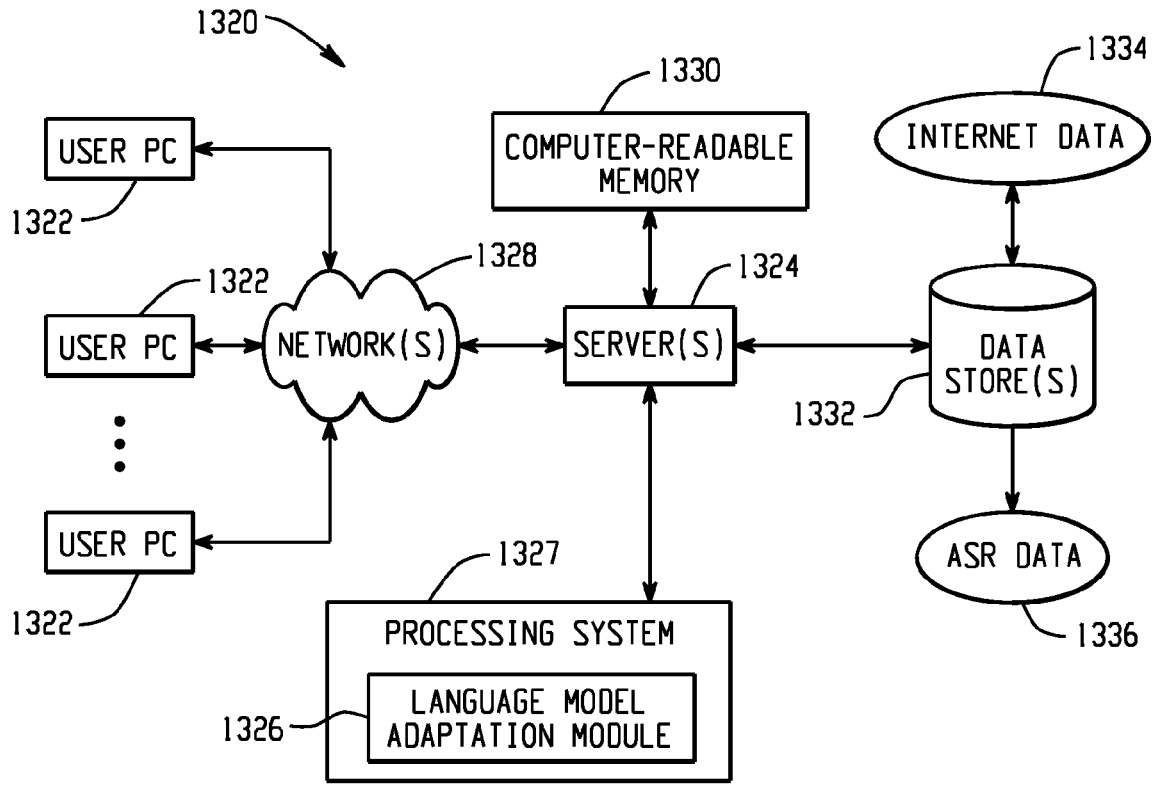
Figure 9C:
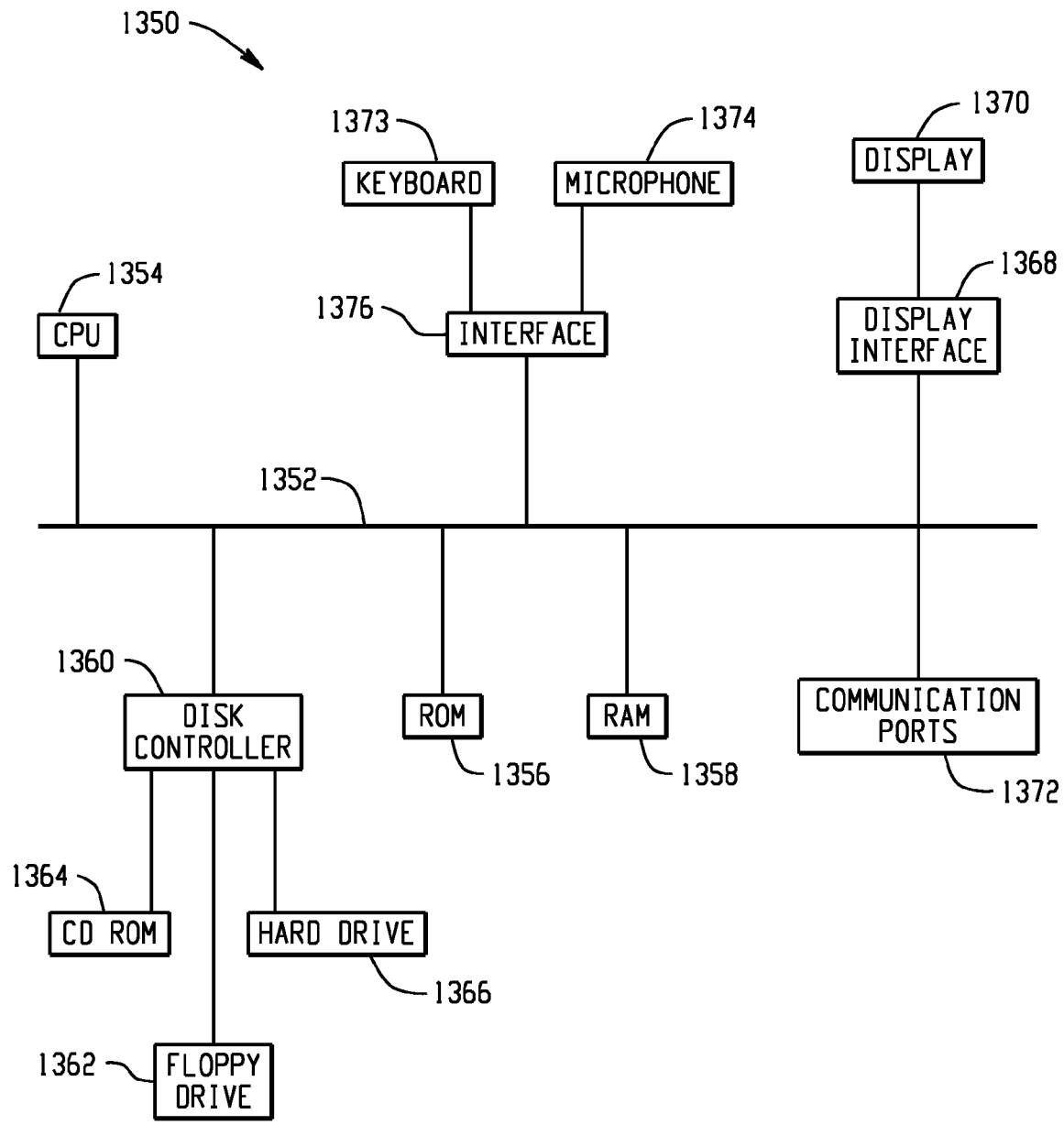

FIGS. 9A, 9B, and 9C depict example systems for use in implementing a method of generating a transcript of a speech sample response to a test question. For example, FIG. 9A depicts an exemplary system 1300 that includes a standalone computer architecture where a processing system 1302 (e.g., one or more computer processors located in a given computer or in multiple computers that may be separate and distinct from one another) includes a language model adaptation module 1304 being executed on it. The processing system 1302 has access to a computer-readable memory 1306 in addition to one or more data stores 1308. The one or more data stores 1308 may include internet data 1310 as well as ASR data 1312.

FIG. 9B depicts a system 1320 that includes a client server architecture. One or more user PCs 1322 access one or more servers 1324 running a language model adaptation module 1326 on a processing system 1327 via one or more networks 1328. The one or more servers 1324 may access a computer readable memory 1330 as well as one or more data stores 1332. The one or more data stores 1332 may contain internet data 1334 as well as ASR data 1336.

FIG. 9C shows a block diagram of exemplary hardware for a standalone computer architecture 1350, such as the architecture depicted in FIG. 9A that may be used to contain and/or implement the program instructions of system embodiments of the present invention. A bus 1352 may serve as the information highway interconnecting the other illustrated components of the hardware. A processing system 1354 labeled CPU (central processing unit) (e.g., one or more computer processors at a given computer or at multiple computers), may perform calculations and logic operations required to execute a program. A non-transitory processor-readable storage medium, such as read only memory (ROM) 1356 and random access memory (RAM) 1358, may be in communication with the processing system 1354 and may contain one or more programming instructions for performing the method of generating a transcript of a speech sample response to a test question. Optionally, program instructions may be stored on a non-transitory computer readable storage medium such as a magnetic disk, optical disk, recordable memory device, flash memory, or other physical storage medium.

A disk controller 1360 interfaces one or more optional disk drives to the system bus 1352. These disk drives may be external or internal floppy disk drives such as 1362, external or internal CD-ROM, CD-R, CD-RW or DVD drives such as 1364, or external or internal hard drives 1366. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1360, the ROM 1356 and/or the RAM 1358. Preferably, the processor 1354 may access each component as required.

A display interface 1368 may permit information from the bus 1352 to be displayed on a display 1370 in audio, graphic, or alphanumeric format. Communication with external devices may optionally occur using various communication ports 1372.

In addition to the standard computer-type components, the hardware may also include data input devices, such as a keyboard 1373, or other input device 1374, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer-implemented method of generating a transcript of a speech sample response to a test question, comprising:
   accessing content of a test question using a processing system;
   acquiring supplemental data content based on the content of the test question using the processing system;
   receiving a speech sample that is responding to the test question at an automatic speech recognizer having an adaptive language model; and
   generating a transcript of the speech sample with the automatic speech recognizer using the adaptive language model;
   the automatic speech recognizer applying the adaptive language model adapted to the test question based on the acquired supplemental data content to improve recognition capabilities of the automatic speech recognizer using the processing system, wherein the adaptive language model is adapted to the test question based on the supplemental data content including (i) prior automated speech recognition data related to the test question based on speech recognition without the adaptive language model, (ii) data related to the test question retrieved using the test question as a query, and (iii) human-generated transcript data related to the test question, the language model comprising a weighted index of words, one or more of the weights being determined by training the language model relative to a plurality of training items.

2. The method of claim 1, wherein the prior automated speech recognition data related to the test question is based on other spoken responses to the test question.

3. The method of claim 2, further comprising:
   automatically recognizing speech in one of the other spoken responses to generate a training transcript;
   identifying words in the training transcript that the automatic speech recognizer has indicated a high degree of confidence of correctness;
   using the identified words to adapt the language model.

4. The method of claim 3, further comprising:
   identifying words in the training transcript that the automatic speech recognizer has indicated a low degree of confidence of correctness;
   performing manual transcription of a portion of the words in the training transcript based on the indicated low degree of confidence to generate a set of supplemental words;
   further adapting the language model using the set of supplemental words.

5. The method of claim 1, wherein the data related to the test question retrieved using the test question as the query is acquired by performing a search based on the content of the test question and compiling the data based on results of the search.

6. The method of claim 5, wherein the search is an Internet search performed using a search engine.

7. The computer-implemented method of claim 1, wherein the prior automated speech recognition data related to the test question is based on other spoken responses to the test question, the method further comprising:
   automatically recognizing speech in one of the other spoken responses to generate a training transcript;
   determining a plurality of fixed-length word sequences included in the training transcript;
   for each of the word sequences, determining a confidence score indicating a degree of confidence of the correctness of the word sequence, the confidence score being determined based on an output of the automatic speech recognizer;
   identifying word sequences that have a degree of confidence above a threshold value; and
   using the identified word sequences to adapt the language model, wherein an entirety of the training transcript is not used in adapting the language model.

8. The method of claim 1, wherein the adaptive language model is initially a generic language model based on a test of English as a foreign language, and wherein the generic language model is adapted based on the acquired supplemental data content.

9. A system for generating a transcript of a speech sample response to a test question, comprising:
   one or more processors;
   one or more non-transitory computer-readable storage mediums containing instructions configured to cause the one or more processors to perform operations including:
   accessing content of a test question;
   acquiring supplemental data content based on the content of the test question;
   receiving a speech sample that is responding to the test question at an automatic speech recognizer having an adaptive language model; and
   generating a transcript of the speech sample with the automatic speech recognizer using the adaptive language model;
   the automatic speech recognizer applying the adaptive language model adapted to the test question based on the acquired supplemental data content to improve recognition capabilities of the automatic speech recognizer, wherein the adaptive language model is adapted to the test question based on the supplemental data content including (i) prior automated speech recognition data related to the test question based on speech recognition without the adaptive language model, (ii) data related to the test question retrieved using the test question as a query, and (iii) human-generated transcript data related to the test question, the language model comprising a weighted index of words, one or more of the weights being determined by training the language model relative to a plurality of training items.

10. The system of claim 9, wherein the prior automated speech recognition data related to the test question is based on other spoken responses to the test question.

11. The system of claim 10, wherein the operations further include:
   automatically recognizing speech in one of the other spoken responses to generate a training transcript;
   identifying words in the training transcript that the automatic speech recognizer has indicated a high degree of confidence of correctness;
   using the identified words to adapt the language model.

12. The system of claim 11, wherein the operations further include:
   identifying words in the training transcript that the automatic speech recognizer has indicated a low degree of confidence of correctness;
   performing manual transcription of a portion of the words in the training transcript based on the indicated low degree of confidence to generate a set of supplemental words;
   further adapting the language model using the set of supplemental words.

13. The system of claim 9, wherein the data related to the test question retrieved using the test question as the query is acquired by performing a search based on the content of the test question and compiling the data based on results of the search.

14. The system of claim 13, wherein the search is an Internet search performed using a search engine.

15. The system of claim 9, wherein the prior automated speech recognition data related to the test question is based on other spoken responses to the test question, the operations further comprising:
   automatically recognizing speech in one of the other spoken responses to generate a training transcript;
   determining a plurality of fixed-length word sequences included in the training transcript;
   for each of the word sequences, determining a confidence score indicating a degree of confidence of the correctness of the word sequence, the confidence score being determined based on an output of the automatic speech recognizer;
   identifying word sequences that have a degree of confidence above a threshold value; and
   using the identified word sequences to adapt the language model, wherein an entirety of the training transcript is not used in adapting the language model.

16. The system of claim 9, wherein the adaptive language model is initially a generic language model based on a test of English as a foreign language, and wherein the generic language model is adapted based on the acquired supplemental data content.

17. A non-transitory computer program product for generating a transcript of a speech sample response to a test question, tangibly embodied in a machine-readable non-transitory storage medium, including instructions configured to cause a data processing system to perform operations including:
   accessing content of a test question;
   acquiring supplemental data content based on the content of the test question;
   receiving a speech sample that is responding to the test question at an automatic speech recognizer having an adaptive language model; and
   generating a transcript of the speech sample with the automatic speech recognizer using the adaptive language model;
   the automatic speech recognizer applying the adaptive language model adapted to the test question based on the acquired supplemental data content to improve recognition capabilities of the automatic speech recognizer, wherein the adaptive language model is adapted to the test question based on the supplemental data content including (i) prior automated speech recognition data related to the test question based on speech recognition without the adaptive language model, (ii) data related to the test question retrieved using the test question as a query, and (iii) human-generated transcript data related to the test question, the language model comprising a weighted index of words, one or more of the weights being determined by training the language model relative to a plurality of training items.

18. The non-transitory computer program product of claim 17, wherein the prior automated speech recognition data related to the test question is based on other spoken responses to the test question, the operations further including:
   automatically recognizing speech in one of the other spoken responses to generate a training transcript;
   determining a plurality of fixed-length word sequences included in the training transcript;
   for each of the word sequences, determining a confidence score indicating a degree of confidence of the correctness of the word sequence, the confidence score being determined based on an output of the automatic speech recognizer;
   identifying word sequences that have a degree of confidence above a threshold value; and
   using the identified word sequences to adapt the language model, wherein an entirety of the training transcript is not used in adapting the language model.

* * * * *